Patented Nov. 25, 1941

2,263,716

UNITED STATES PATENT OFFICE 2,263,716

PARASITICIDE DERIVED FROM TERPENES

Joseph N. Borglin, Wilmington, Del., assignor to Hercules Powder Company, Wilmington, Del., a corporation of Delaware No Drawing. Application March 29, 1940, Serial No. 326,658

6 Claims. (Cl. 167—30)

This invention relates to a parasiticide and more particularly to a parasiticide composition comprising a terpene compound having the type formula R—(CNX) in which R is a radical of a terpene ether and X is sulfur, selenium, or tellurium.

I have found that these compounds, the terpene ether thiocyanates, the terpene ether selenocyanates, and terpene ether tellurocyanates, are exceedingly effective parasiticides either when used alone or diluted with other toxic materials or with carriers. Furthermore, I have found that, strangely enough, they are definitely more effective parasiticides than the corresponding alkyl compounds heretofore used for this purpose. The various thio-, seleno-, and tellurocyanates of the terpene ethers are particularly useful as insecticides and especially as contact insecticides against insects such as aphids, flies, roaches, bedbugs, fleas, etc., and are useful in the control of fungi or other micro-organisms.

The composition in accordance with this invention will comprise a compound of the type formula, R—(CNX), in which R is a radical of a terpene ether and X is an element of the group consisting of sulfur, selenium, and tellurium, and the —(CNX) is linked to a carbon atom in the terpene nucleus. As will be apparent from the method of preparation, the terpene ether radical may be derived from such terpene ethers as, for example, terpinyl ethers of methyl, ethyl, propyl, butyl, phenyl, lauryl, oleyl, stearyl, furfuryl, etc. alcohols; or such ethers as the terpinyl ethers of ethylene glycol, glycerol, triethylene glycol, nitroisopropyl glycol, monoethyl ether of ethylene glycol, mono- or diethyl ether of glycerol, glycol monoacetate, glycerol dipropionate, etc. Similar ethers derived from other terpene radicals such as are formed by the reaction of alcohols of the nature of those mentioned with dipentene, terpinene, terpinolene, borneol, fenchyl alcohol, etc. may also serve as the terpene ether base from which the thiocyanates, selenocyanates, and tellurocyanates utilized according to this invention may be derived.

The thiocyanates, selenocyanates, and tellurocyanates of the terpene ethers may be prepared by the method disclosed in U. S. Patent 2,188,495 or in my application Serial No. 196,630, filed March 18, 1938. In accordance with these methods of preparation an unsaturated terpene ether is reacted with thiocyanogen, selenocyanogen, or tellurocyanogen, conveniently at room temperature, and recovering the reaction product; or a terpene ether mercaptide prepared, for example, by the reaction of a terpene ether mercaptan with a metal salt such as lead acetate, copper acetate, etc., is reacted with a cyanogen halide. Examples of the preparation of thiocyanates of terpene ethers follow. All parts and percentages herein are by weight.

EXAMPLE I

*Preparation of thiocyanate of terpinylmethyl ether*

The thiocyanate of a terpinylmethyl ether (the ether prepared by the addition of methanol to pinene in the presence of sulfuric acid), was prepared by adding 60 parts by weight of lead thiocyanate to 250 parts by weight of glacial acetic acid and 25 parts by weight of bromine. When the bromine had completely reacted, 50 parts by weight of terpinylmethyl ether was slowly added and the solution allowed to stand overnight. It was then filtered, the filtrate washed with water to remove the acetic acid, and the recovered product dried. The product analyzed 9.2% sulfur showing it to contain 65% of the desired thiocyanate.

EXAMPLE II

*Preparation of thiocyanate of ethyleneglycol ether of dipentene*

The thiocyanate of dipentene ethyleneglycol ether (the ether prepared by the addition of ethyleneglycol to dipentene in the presence of sulfuric acid) was prepared by adding 41.7 parts by weight of lead thiocyanate to 150 parts by weight of glacial acetic acid and then adding slowly 19.5 parts by weight of bromine. After the solution had stood for 1 hour with intermittent shaking, 30 parts of the dipentene ether of ethyleneglycol was added slowly with agitation and external cooling of the reaction mixture. The reaction mixture was allowed to stand overnight, then filtered, the filtrate washed with water to remove the acetic acid, and the recovered product (28 parts) dried. The product analyzed 7.0% sulfur.

Example III

*Preparation of the thiocyanate of the nitro-isobutyl ether of camphene*

The thiocyanate of the nitroisobutyl ether of camphene (ether prepared by the addition of nitroisobutyl alcohol to camphene in the presence of 85% phosphoric acid) was prepared by slowly adding 25 parts by weight of bromine to 65 parts by weight of lead thiocyanate suspended in 250 parts by weight of glacial acetic acid; allowing the mixture to stand with intermittent shaking until the color of bromine had disappeared, and then slowly adding 74 parts by weight of camphene nitroisobutyl ether and allowing the mixture to stand for three days at room temperature. The precipitated salts were filtered off and about 100 parts of petroleum ether added to the filtrate, which was then water washed until acid free. Upon removal of the solvent by bubbling air through the solution under reduced pressure, 47 parts of the thiocyanate of camphene (isobornyl) nitroisobutyl ether was obtained. It analyzed 2.3% sulfur.

Example IV

*Preparation of the thiocyanate of terpinylpropyl ether*

Forty parts by weight of terpinylpropyl ether mercaptan prepared by the method described in U. S. Patent 2,076,875 was converted to the lead mercaptide by mixing it with an excess of an aqueous solution of lead acetate. An ether solution of the terpenepropyl ether lead mercaptide was then added to an ethyl alcohol solution of cyanogen bromide and lead bromide precipitated. The filtered solution was then washed with water and the solvent evaporated to recover the thiocyanate of the terpinylpropyl ether.

Example V

*Preparation of the thiocyanate of terpinyl-nitro-isobutyl ether*

Forty parts by weight of terpinyl-nitroisobutyl ether mercaptan prepared by the method described in the U. S. Patent 2,076,875 was converted to the lead mercaptide by mixing it with an excess of an aqueous solution of lead acetate. An ether solution of the terpene nitroisobutyl ether lead mercaptide was then added to an ethyl alcohol solution of cyanogen bromide and lead bromide precipitated. The filtered solution was then washed with water and the solvent evaporated to recover the thiocyanate of terpene nitroisobutyl ether.

The parasiticide according to this invention will usually comprise a thiocyanate, selenocyanate, or tellurocyanate of a terpene ether and an inert carrier material or diluent. It may also contain a diluent or carrier material which may be another toxic material or an admixture of toxic materials, or it may contain such additional toxic material or materials and an inert diluent.

The inert carrier selected for use in the compositions according to this invention may be varied depending upon the method of application by which, and the purpose for which, the composition will be ultimately used. This composition can be used as a solution or an emulsion suitable for application as a spray or as a dusting powder or as a paint or gum. The carrier used in a composition intended for application as a spray will be a liquid of the type commonly used as a carrier liquid in parasiticide compositions such as, for example, water, petroleum hydrocarbons, etc., as ordinary or deodorized kerosene, mineral oils, as, white oil, etc. The carrier used in compositions intended for application as a dust will be a finely divided solid of the type commonly used as a carrier for insecticidal dusts such as, for example, talc, colloidal clays, bentonite, fuller's earth, sulfur, etc.

Compositions for application as a spray may be utilized in the form of a solution or suspension. Such suitable solutions will comprise a terpene ether thiocyanate, a terpene ether selenocyanate, or terpene ether tellurocyanate or an admixture of these materials dissolved in a carrier liquid which is a solvent thereof, such as, for example, deodorized or ordinary kerosene, mineral oils, as, white oil, etc. Such compositions are suitable for use in the control of insects, such as, flies, mosquitoes, roaches, bed bugs, fleas, silver fish, etc.

A typical composition of this type for spray application will consist of a terpene ether thiocyanate, terpene ether selenocyanate, or terpene ether tellurocyanate in kerosene, the terpene ether derivative being in an amount within the range of about 0.1% to about 10% by weight, of the composition. Concentrates for dilution to produce compositions of this type will carry higher concentrations of a terpene ether thiocyanate, terpene ether selenocyanate, or terpene ether tellurocyanate.

Compositions for application as a spray may also be utilized in the form of an aqueous emulsion. Such compositions will comprise a thiocyanate, selenocyanate, or tellurocyanate derivative of a terpene ether which may be either emulsified directly in water, or dissolved in a limited amount of a water-immiscible solvent and the solution thus formed emulsified in water. Such emulsions will desirably contain emulsifying agents such as, for example, a soap, a sulfonated oil, salts of sulfated fatty or resin alcohols, etc. They may be prepared in completely finished form at the point of manufacture or they may be prepared in the form of a concentrate comprising the terpene derivative and an emulsifying agent, and then diluted and emulsified with water at the point of application, thus, avoiding the packaging, transportation and handling of water. Emulsified compositions of this type are advantageous for the destruction of insects attacking horticultural plants such as, for example, the various kinds of plant lice, harlequin, cabbage bugs, canker worms, thrips, aphids, Japanese beetles, Mexican bean beetles, etc.

The insecticidal compositions in accordance with this invention may also be used in the form of insecticidal dust for the destruction of insects which attack agricultural or horticultural plants and other insects. The terpene ether thiocyanates, selenocyanates, or tellurocyanates, either alone or admixed with other toxic insecticidal materials, will be thoroughly admixed with a powdered solid material of the type commonly used for insecticidal dusts to produce such an insecticidal dust.

A typical composition of this type is, for example, talc, ground to 200 mesh and incorporating from about 1% to about 10% by weight, of terpene ether thiocyanate, selenocyanate, or tellurocyanate. Concentrates for dilution to produce compositions of this type will carry higher concentrations of a terpene ether thiocyanate, terpene ether selenocyanate, or terpene ether tellurocyanate.

The compositions in accordance with this invention are further illustrated by the formulae given in Table I which follows:

This application is a continuation-in-part of my application entitled "Terpene thiocyanate insecticides," Serial No. 207,779, filed May 13, 1938.

Table I

| Ingredients | I | II | III | IV | V | VI | VII | VIII | IX | X | XI | XII |
|---|---|---|---|---|---|---|---|---|---|---|---|---|
| | Percent | Percent | Percent | Percent | Percent | Percent | Percent | Percent | Percent | Percent | Percent | Percent |
| Thiocyanate of terpinyl glycol ether | 5 | | | | 3 | | 2 | | 2 | 2 | 10 | 10 |
| Thiocyanate of terpene nitroisobutyl ether | | 5 | | 2 | | | | | 1 | 1 | | |
| Thiocyanate of dipentene methyl ether | | | 5 | | | 3 | | 5 | | 1 | | |
| Deodorized kerosene | 95 | 93 | 95 | 96 | 95 | 95 | 90 | 94 | 95 | 93 | 90 | 80 |
| Pine oil | | | | | | | 3 | | | | | 10 |
| Glycol ether of pinene | | 2 | | | | | | | | 3 | | |
| Nicotine | | | | | | 2 | 5 | | | | | |
| Pyrethrum | | | | | 1 | | | | | | | |
| Rotenone | | | | 2 | 1 | | | 1 | 1 | 1 | | |

Examples of insecticidal powder in accordance with this invention are shown in Table II which follows:

Table II

| | XIII | XIV | XV |
|---|---|---|---|
| | Percent | Percent | Percent |
| Terpene ether thiocyanate | 10 | 25 | 25 |
| Pulverized sulfur | 5 | 75 | |
| Kieselguhr | 85 | | 75 |

The compositions in accordance with this invention are further illustrated, and their high toxicity shown, by the data set forth in Table III which follows:

Table III

| Terpene ether thiocyanate used | Concentration in deodorized kerosene | Toxicity to house flies as tested by the Peet-Grady method | |
|---|---|---|---|
| | | Percent knocked down | Percent dead in 24 hours |
| Thiocyanate of methyl ether of pinene | 10.0 | 94 | 90 |
| Thiocyanate of ethyl ether of pinene | 10.0 | 100 | 98 |

By parasiticide herein and in the claims is meant a composition intended to kill insects and other insect-like pestiferous animals and also undesired micro-organisms.

It will be understood that the details and examples given herein are by way of illustration and not by way of limitation of the invention as broadly described and claimed.

What I claim and desire to protect by Letters Patent is:

1. A parasiticide comprising a compound of the formula R—CNX in which R is a terpene ether, X is an element selected from the group consisting of sulfur, selenium, and tellurium and the CNX radical is directly attached to a carbon atom of the terpene portion of the terpene ether.

2. A parasiticide comprising a compound of the formula R—CNS in which R is a terpene ether and in which the CNS group is directly attached to a carbon atom of the terpene portion of the terpene ether.

3. A parasiticide comprising a thiocyanate of an ether of pinene in which the thiocyanate group is directly attached to a carbon atom of the terpene portion of the terpene ether.

4. A parasiticide comprising terpinyl methyl ether thiocyanate, the thiocyanate group being directly attached to a terpene carbon atom.

5. A parasiticide comprising terpinyl ethyl ether thiocyanate, the thiocyanate group being directly attached to a terpene carbon atom.

6. A parasiticide comprising terpinyl glyceryl ether thiocyanate, the thiocyanate group being directly attached to a terpene carbon atom.

JOSEPH N. BORGLIN.